(No Model.)
H. PEAKE.
CASE.
No. 524,950.  Patented Aug. 21, 1894.
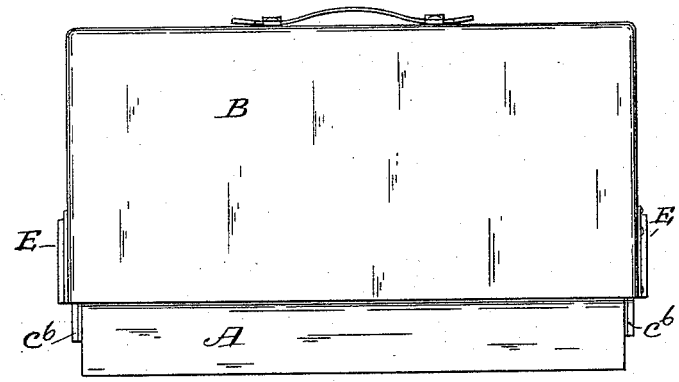
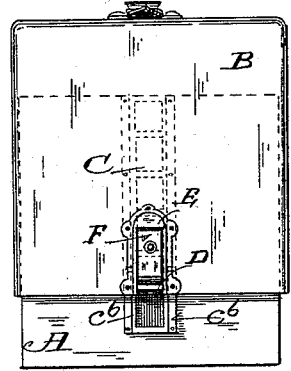
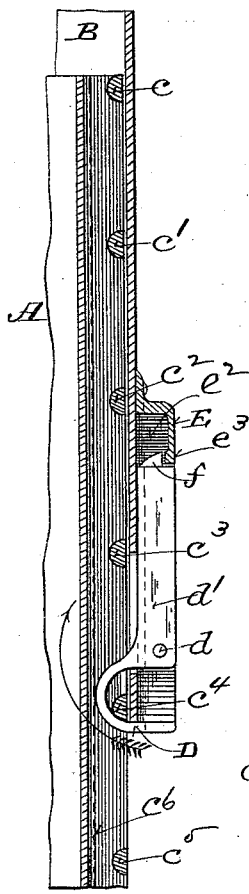
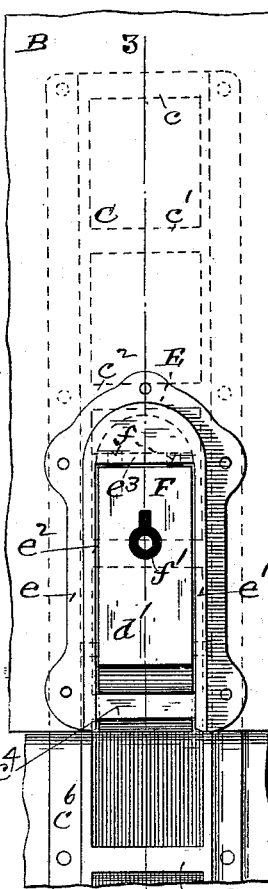
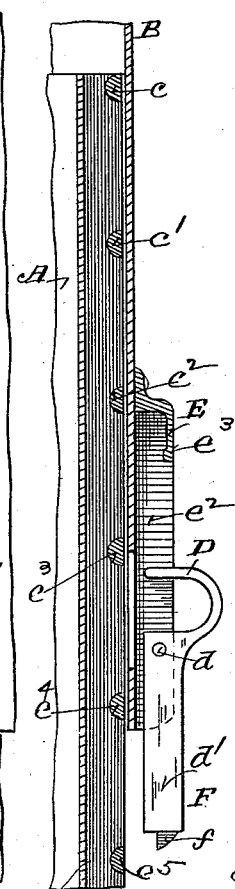
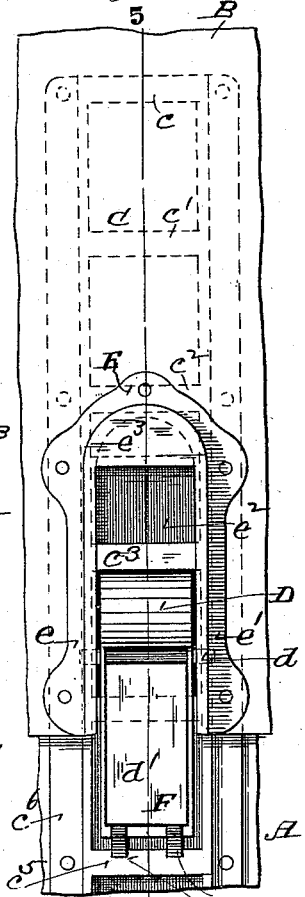
WITNESSES
Edward L. Farrell
A. Bonville
INVENTOR
Henry Peake
by C. D. Moody
his atty

UNITED STATES PATENT OFFICE.

HENRY PEAKE, OF ST. LOUIS, MISSOURI.

CASE.

SPECIFICATION forming part of Letters Patent No. 524,950, dated August 21, 1894.

Application filed April 2, 1894. Serial No. 505,993. (No model.)

*To all whom it may concern:*

Be it known that I, HENRY PEAKE, of St. Louis, Missouri, have made a new and useful Improvement in Cases, of which the following is a full, clear, and exact description.

The improvement relates to various styles of cases, and especially to that class of cases having a top part and a bottom part that are adapted to telescope upon each other, and being a familiar form of a traveler's case, and the improvement consists in a mode of locking the parts together substantially as is hereinafter set forth and claimed, aided by the annexed drawings, making part of this specification, in which—

Figure 1 is a side elevation of the case having the improvement; Fig. 2 an end elevation of the same; Fig. 3 a vertical section on the line 3—3 of Fig. 4, which, in turn is an elevation from the point of view of Fig. 2, and showing that portion of the case with which the improvement is immediately connected; and Fig. 5 a vertical section on the line 5—5 of Fig. 6 which in turn is a view similar to that of Fig. 4, but showing the hook in its unlocked position. The last four named views are upon an enlarged scale.

The same letters of reference denote the same parts.

A represents the bottom part of the case and B the upper part thereof. These parts are constructed and operated in the usual manner saving as they are supplemented or modified by the embodiment therein of the improvement under consideration. The lower part is provided with a series of keepers C. The series may consist of any desired number. In the drawings six are shown, namely $c$, $c'$, $c^2$, $c^3$, $c^4$, $c^5$. In practice the keepers are attached to or form part of a plate, $c^6$, that in turn in any suitable manner is secured to the case-part A substantially as shown. The upper case-part B is provided with an adjustable hook D that is adapted to engage with any one of the keepers and when engaged to confine the case-part B vertically upon the case-part A and thus serve to lock the case-parts together at any desired point of adjustment vertically. The hook is pivoted at $d$ to enable it to turn to engage with or to be disengaged from the keeper, substantially as is indicated by the two positions of the hook shown in the drawings. The hook is shown in its locked position in Figs. 3 and 4, and in its unlocked position in Figs. 5 and 6. It is also shown in its locked position in Fig. 2. While the hook may be connected with the case-part A in various ways so long as it is adapted to operate as described it is preferably connected with a plate E that in turn is secured to the case-part B. That is, the pivot $d$ is held at its ends in the sides $e$, $e'$, of the plate E. The hook has a shank $d'$ that when the hook is in its locking position enters a recess $e^2$ in the plate E. The shank forms a handle by which the hook can be turned. It also is shaped to form or is provided with a lock F whose bolt $f$, when shot out to engage with the flange or part $e^3$ of the plate E, serves to secure the hook from being turned upon its pivot.

In operation, the upper case part is slipped downward onto the lower case-part to the desired level and then the hook is turned from its position of Figs. 5 and 6 into its position of Figs. 2, 3, and 4, by which movement the hook-point is passed around that one of the keepers it is desired to have the hook engaged with. The hook-shank is also brought into the recess in the plate E. The hook tends to remain in its locked position, but to insure its continued engagement with the keeper the lock-mechanism is brought into use. Its bolt $f$ is preferably a spring-actuated one and as soon as the hook is turned into the position of Figs. 3 and 4 it shoots out to engage with the portion $e^3$ of the plate E, substantially as shown.

To unlock the case, the bolt, by means of a key inserted in the key-hole $f''$, is withdrawn to free the hook-shank, and then the hook is turned into its position of Figs. 5 and 6.

The described locking-mechanism may be applied to both ends of the case, and if desired to the side or sides of the case.

I claim—

1. The combination of the case-part provided with one or more keepers, with the other case-part provided with the pivoted reversible hook having its concave part facing outward when fastened in position, substantially as described.

2. The combination of a case-part having a series of keepers with the complemental case-part having a reversible hook whose concave part faces outward when in engagement with a keeper, substantially as described.

3. The combination of a case-part having one or more keepers with the complemental case-part having the pivoted hook with its concave part facing outward and provided with a guard which prevents the escape of the keeper when the hook is fastened, substantially as described.

4. The combination of a case-part having one or more keepers with the complemental case-part having the pivoted reversible hook with its concave part facing outward when the hook is locked and having a lock attached to the hook, substantially as described.

5. The combination of a case-part having one or more keepers, with the complemental case-part having the pivoted reversible hook with a catch attached thereto, and a guard for said hook preventing the escape of the keeper when the hook is fastened, substantially as described.

Witness my hand this 31st day of March, 1894.

H. PEAKE.

Witnesses:
   C. D. MOODY,
   A. BONVILLE.